United States Patent [19]
Todd et al.

[11] Patent Number: 4,459,481
[45] Date of Patent: Jul. 10, 1984

[54] ION SOURCE FOR HIGH-PRECISION MASS SPECTROMETRY

[75] Inventors: Peter J. Todd; Henry S. McKown; David H. Smith, all of Oak Ridge, Tenn.

[73] Assignee: The United States of America as represented by the United States Department of Energy, Washington, D.C.

[21] Appl. No.: 371,744

[22] Filed: Apr. 26, 1982

[51] Int. Cl.[3] .............................................. B01D 59/44
[52] U.S. Cl. .................................... 250/282; 250/288; 250/298; 250/396 R
[58] Field of Search ............... 250/281, 298, 282, 283, 250/288, 423 R, 423 F, 396 R; 313/361.1

[56] References Cited

U.S. PATENT DOCUMENTS

| | | | |
|---|---|---|---|
| 3,621,240 | 11/1971 | Cohen et al. | 250/282 |
| 4,002,912 | 1/1977 | Johnson | 250/396 R |
| 4,160,161 | 7/1979 | Horton | 250/423 R |
| 4,230,946 | 10/1980 | Wells et al. | 250/281 |

OTHER PUBLICATIONS

"A Mass Spectrometer for Isotope and Gas Anal.", Nier, *Rev. of Sci. Inst.*, vol. 18, No. 6, 1947, pp. 398–411.
"Ion Optics for the V-Type Surface Ionization Filament Used in Mass Spect.", Dietz, *Rev. of Sci. Inst.*, vol. 30, No. 4, 1959, pp. 235–241.
"Elemental Composition Determination by Field-Ion Mass Spect.", Beckey, *Anal. Chem.*, vol. 40, No.4, 1968, pp. 835–836.
"Simultaneous Pluotonium and Uranium Isotope Anal. from a Single Resin Bond—A Simplified Chem. Tech. for Assaying Spect. Reactor Fuels", Walker et al., *Anal. Letters*, 7(8&9), pp. 563–574, 1974.

*Primary Examiner*—Bruce C. Anderson
*Attorney, Agent, or Firm*—Fred O. Lewis; Stephen D. Hamel; Michael F. Esposito

[57] ABSTRACT

The invention is directed to a method for increasing the precision of positive-ion relative abundance measurements conducted in a sector mass spectrometer having an ion source for directing a beam of positive ions onto a collimating slit. The method comprises incorporating in the source an electrostatic lens assembly for providing a positive-ion beam of circular cross section for collimation by the slit.

4 Claims, 3 Drawing Figures

ION SOURCE FOR HIGH-PRECISION MASS SPECTROMETRY

BACKGROUND OF THE INVENTION

This invention relates generally to ion sources for mass spectrometers and more particularly to ion sources for mass spectrometers of the sector type. The invention is a result of a contract with the United States Department of Energy.

Sector mass spectrometers are used extensively for making analyses requiring highly precise determinations of the relative abundances of positive ions. The term "sector spectrometer" is used herein to refer to a mass spectrometer having parallel, generally sector-shaped magnet faces which cooperatively define a narrow elongated gap through which an ion beam is passed. Such spectrometers conventionally are designed with rectangular symmetry throughout, meaning that the various apertures or slits through which the ion beam is passed are of generally rectangular configuration.

FIG. 1 depicts a well-known modified Nier-type ion source which is designed with rectangular symmetry for use in sector mass spectrometers. As shown, the ion source is mounted adjacent to any suitable means 5 for generating positive ions. The source includes the following: a first electrostatic lens 7 for forming the positive ions into a beam and directing the same onto a first collimating slit 9; a second electrostatic lens (a pair of z-plates) 11 for positioning and focusing the beam in the z direction (shown in FIG. 1); and a second beam-collimating slit 13. More specifically, the beam-forming lens 7 comprises a case plate 15, a drawout plate 17, and a beam-alignment plate 19 for positioning and focusing.

Although ion sources of the Nier and modified-Nier types have been used extensively for many years, there has long been a need for even more efficient sources capable of providing lower limits of detection. In addition to being less efficient than desired, the conventional sources are relatively expensive to fabricate. Furthermore, they become contaminated with ion-beam products after relatively short periods of normal use.

SUMMARY OF THE INVENTION

Accordingly, it is an object of this invention to provide a novel ion source for mass spectrometers.

It is another object to provide an ion source characterized by improved precision and sensitivity.

It is still another object to provide an ion source for improving the precision of sector mass spectrometers.

It is another object to provide an ion source characterized by longer efficient operating life.

It is another object to provide an ion source for sector spectrometers which is relatively inexpensive to fabricate.

It is another object to provide a method for improving precision in sector mass spectrometers.

Other objects and advantages will be made evident hereinafter.

In one aspect, the invention may be summarized as follows: in the art of making sector mass spectrometer analyses, wherein positive ions are focused into a beam which is directed through a collimating slit, and then through a magnetic field, the method of increasing precision of analysis comprising: focusing said ions into a beam of circular cross section for collimation by said slit.

DETAILED DESCRIPTION OF THE INVENTION

We have found by experiment that, unexpectedly, precision can be sigificantly improved in an otherwise-standard sector mass spectrometer if the electrostatic-lens element of the ion source is designed with circular symmetry. That is, we have found that a valuable improvement is obtained if the lens is designed to provide a circularly symmetrical electrostatic field for forming the ion beam. The remainder of the ion source (e.g., the collimator plates and z-plates) may be of conventional design. Thus, in contrast to conventional practice, our source utilizes both circular symmetry (the beam-forming lens) and rectangular symmetry (the beam collimators and z-plates). An important advantage of the new source is that it provides significantly enhanced precision. It also provides a useful improvement in sensitivity. In addition, as compared with conventional Nier-type sources, the new source is less expensive to fabricate and operates for longer periods before becoming contaminated to an unacceptable extent.

Figure 2:
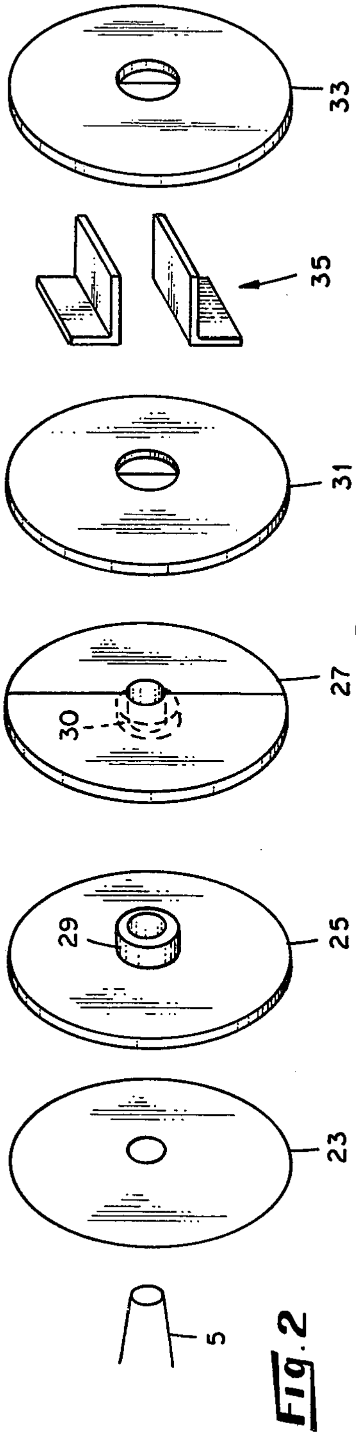
FIG. 2 is a diagram of the source of FIG. 1 as modified in accordance with the invention.
Figure 1:
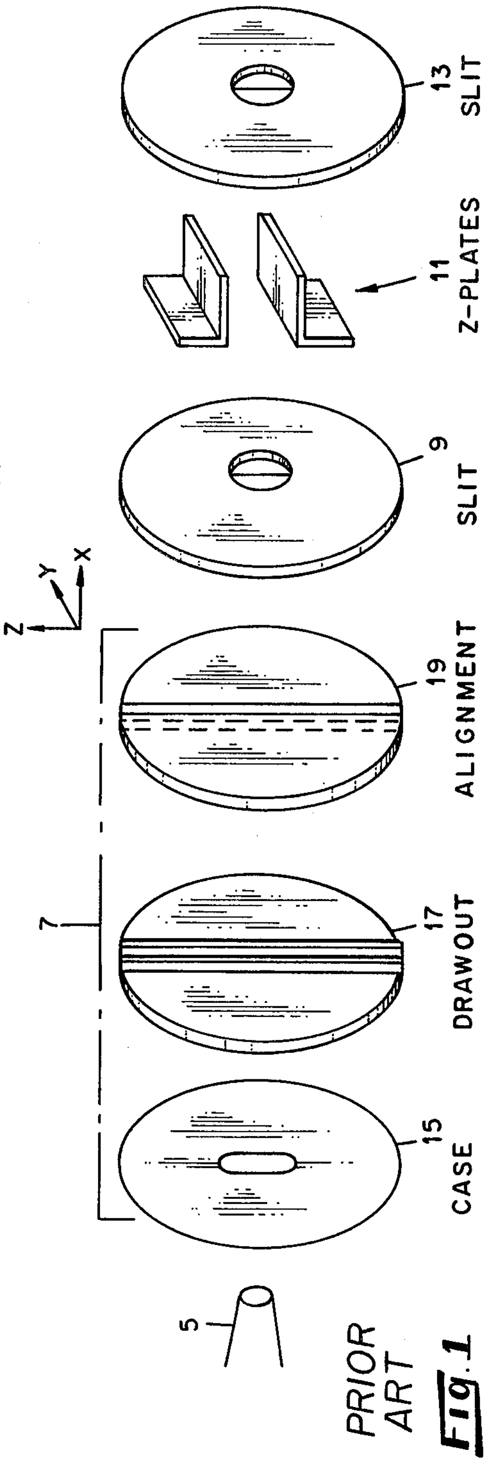
PRIOR ART Fig. 1
FIG. 1 is a schematic diagram of a conventional Nier-Dietz ion source.

Referring to FIG. 2, an ion source was designed in accordance with the invention to compare its performance with the standard source illustrated in FIG. 1. Because the comparisions were to be made in the same mass spectrometer, the plates for the new source were designed to have the same outside diameters and inter-plate spacing as the standard source. In accordance with the invention, the beam-forming lens 21 for the new source was designed with circular symmetry. That is, the case, drawout, and alignment plates 23, 25, and 27 were formed with respective circular apertures. The apertures were formed with diameters (0.64 cm) exceeding the widths of the apertures in the lens plates in the standard source, to permit focusing of ions with a larger off-axis displacement. To provide electrostatic deflection in the y direction and thus compensate for mechanical misalignment of the filament, the lens plate 27 was split about the x-z plane to define a 0.005-cm gap. To reduce spherical aberration, the plates 25 and 27 were provided with optional central cylindrical projections 29 and 30, respectively. The first and second collimator plates 31 and 33 and the z-plates 35 were of essentially standard design. The various plates for the two types of sources were composed of the same materials.

The following table summarizes various dimensions of the new source (dimensions in cm).

TABLE I

| | |
|---|---|
| Plate Thickness | 0.15 |
| Overall Length of Source | 5.40 |
| External Diameter | 5.00 |
| Diameter, Circular Orifices | 0.64 |
| Spacings | |
| Plate 23–Plate 25 | 0.37 |
| Plate 25–Plate 27 | 0.74 |

TABLE I-continued

| | |
|---|---|
| Plate 27–Plate 31 | 1.27 |
| Plate 31–Plate 33 | 2.20 |
| Plate 33–Plate 35 | 0.19 |
| Between Z-plates | 0.95 |
| Slit Widths (plates 31, 33) | 0.018 |

Figure 3:
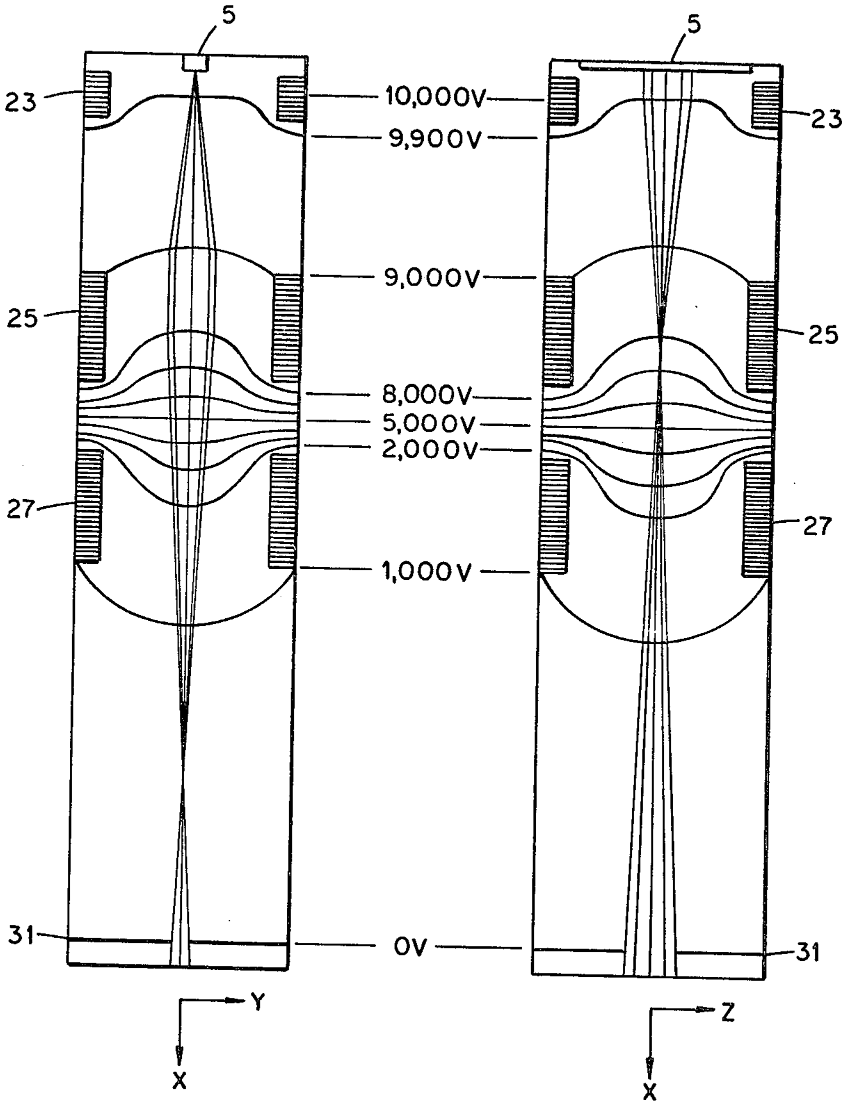
FIG. 3 is a graph showing computer positive-ion trajectories in the x-y and x-z planes for an ion source designed in accordance with the invention.

Detailed calculations of ion trajectories in the new source were performed using an interactive computer program. FIG. 3 shows plots generated by the program. The two plots are cross sections taken in the x-y and x-z planes. Equipotential contour lines and ion trajectories for 0.2 eV ions are shown. The potentials of some of the equipotential lines are shown. Focusing in both planes is clearly apparent; the particular voltages chosen do not produce the crossover point at the collimating slit as would be the case in actual use. The crossover points of the two planes do not coincide, necessitating the additional z direction focusing provided by the z plates 35. The circular symmetry of the source would permit the z plates to be parallel to the x-z plane as well as to the x-y plane.

The two ion sources were compared with respect to actual performance by conducting runs in a standard sector mass spectrometer provided with two 90°, 30-cm radius magnetic analyzers designed for an abundance sensitivity of $10^6$. [*Int. J. Mass Spectrum, Ion Phys.* (1972–1973 ) p. 343] The spectrometer ion-generator comprised a canoe-shaped Re filament containing anion resin beads loaded with uranium or plutonium. No degradation of beam shape was observed in runs conducted with the new source, which produced higher transmission than the standard source. In one experiment, 6 to 10 replicate analyses on each source were made. The average filament temperature required to yield a given count rate was appreciably lower with the new source. The results are presented below.

TABLE II

| Sample | Source | Count rate/sec. | Avg. Temp., °C. |
|---|---|---|---|
| Pu | Nier | $1.5 \times 10^5$ | 1550 |
| Pu | New | $1.5 \times 10^5$ | 1491 |
| U | Nier | $3.0 \times 10^5$ | 1812 |
| U | New | $3.0 \times 10^5$ | 1737 |

With the new source, plutonium and uranium ran about 60° lower and 75° lower, respectively. This represents a difference in ion-beam intensity of a factor of five to seven.

To confirm the improved ion-transmission of the new source, several beads containing known amounts of U and Pu were run to exhaustion to give an overall collection efficiency for the entire system. The quantities present on the beads were determined by selecting several typical beads, extracting the U or Pu, and performing isotopic dilution analyses. This yielded a concentration of metal per unit volume of head. Knowledge of the diameter of any given bead thus allowed calculation of the quantity present. Results of such analyses gave about one ion collected for each 200 atoms loaded for U; for Pu, the figure was one in 65. These figures represent an improvement in transmission of a factor of about 3 or 4 over similar analyses with the standard source. It was also noted that the new source could be operated for longer periods before cleaning was required.

Comparison of internal and external standard deviations was made, using the same analyses as used for Table II. The comparison of precision is presented below.

TABLE III

| | Internal Precision | | External Precision* | |
|---|---|---|---|---|
| Approximate Ratio | Standard | New | Standard | New |
| 0.86 | 0.22 | 0.15 | 0.24 | 0.18 |
| 0.46 | 0.23 | 0.15 | 0.27 | 0.15 |
| 0.01 | 0.55 | 0.28 | 0.55 | 0.28 |

*Precision = standard deviation:

$$s = \left[ \sum_{i=1}^{n} (x_i - \bar{x})^2/(n - 1) \right]^{\frac{1}{2}}$$ where $\bar{x}$ is the average and $x_i$ the individual values of n data points.
Internal precision is defined as the precision between runs on the same resin bead.
External precision is the precision between results from different filament loadings of the same material.

Referring to Table III, in each instance the new source exhibited improved precision. Consistent improvement in precision was noted in subsequent runs with the source. This improvement is attributed in part to the lower operating temperature. Isotopic fractionation of the sample is less at lower temperatures, yielding more stable emission of ions of all masses. Another possible factor contributing to improved precision is the fact that the new source focuses appreciably more sharply than the standard source.

Intuitively, one might expect that an ion source utilizing rectangular symmetry would be best suited for use in a sector mass spectrometer, where the collimating slits form the beam into a rectangular shape. We results are obtained by combining a circularly symmetrical beam-forming lens with the usual rectangular slits. We believe that our improved results are mainly due to the fact that our source provides z focus (as well as y focus) between the filament and the usual z plates. This provides at least two benefits: (1) a larger percentage of the beam is directed onto the first collimating slit 31; (2) a larger percentage of the beam exiting the slit is paraxial—i.e., close enough to the mean ion axis to be focused effectively by the z plates 35. Computer programs using ion optics support this opinion.

We believe that our improved ion source may be used with any known positive-ion generator—as, for example, generators of the thermal—emission or electron-impact types. A key feature of our source is to use a beam-forming lens which provides a circularly symmetrical electrostatic field. In practice, this is most conveniently achieved with rigorously circular apertures, although substantially circular apertures may give some improvement. The thickness of the plates is not critical. Preferably, the apertures are larger than the apertures in conventional source, but this is not essential. Our source may be operated with plate voltages generally similar to those used with standard Nier-type sources. Suitable voltages are shown in FIG. 3 but these are not necessarily the optimum. The voltages applied to the z plates 35 typically are higher than are used in standard sector-spectrometer sources. If desired, the z-plates 35 may be positioned just ahead of the first slit 31. It is not essential that the plates 25 and 27 be provided with the projections 29 and 30. A secondary advantage of the use of circular apertures is that they are simple to machine, reducing fabrication costs. It is within the scope of the invention to use any suitable means—e.g. plates or cylinders—to define the desired circular apertures.

Given the teachings herein and using merely routine experimentation, one versed in the art will be able to determine the optimum source dimensions and operating conditions for a given application.

The scope of the invention is to be defined in the light of the appended claims.

What is claimed is:

1. In th art of making sector mass spectromter analyses wherein positive ions are focused into a beam which is directed through a collimating rectangular slit and then through a sector magnetic field, the improvement comprising:

focusing said ions into a beam of circular cross section for collimation by said slit.

2. The method of claim 1 wherein said focusing is effected with an electrostatic lens assembly including a plurality of spaced electrodes respectively defining circular apertures having a common axis.

3. In the art of making positive-ion relative abundance determinations with a sector mass spectrometer having an ion source for focusing positive ions into a beam and directing the same into a collimating rectangular slit, the method of increasing the precision of said determinations, comprising:

electrostatically focusing said ions into a beam of circular cross section for collimation by said slit.

4. The method of claim 3 wherein said focusing is effected with an electrostatic lens assembly including a plurality of spaced electrodes respectively defining circular apertures which are in alignment.

* * * * *